M. H. ITTNER.
APPARATUS FOR TREATING LIQUIDS WITH GASES.
APPLICATION FILED JAN. 6, 1916.

1,242,445.

Patented Oct. 9, 1917.

INVENTOR
Martin H. Ittner
BY
Pennie Davis & Marvin
ATTORNEYS

M. H. ITTNER.
APPARATUS FOR TREATING LIQUIDS WITH GASES.
APPLICATION FILED JAN. 6, 1916.
1,242,445.
Patented Oct. 9, 1917.
3 SHEETS—SHEET 3.
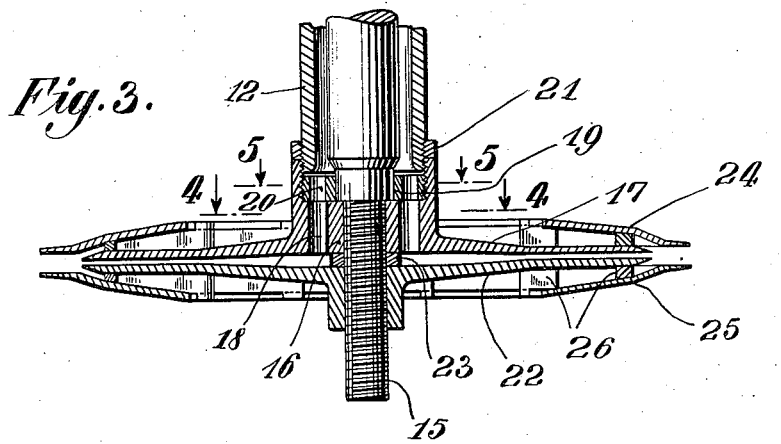
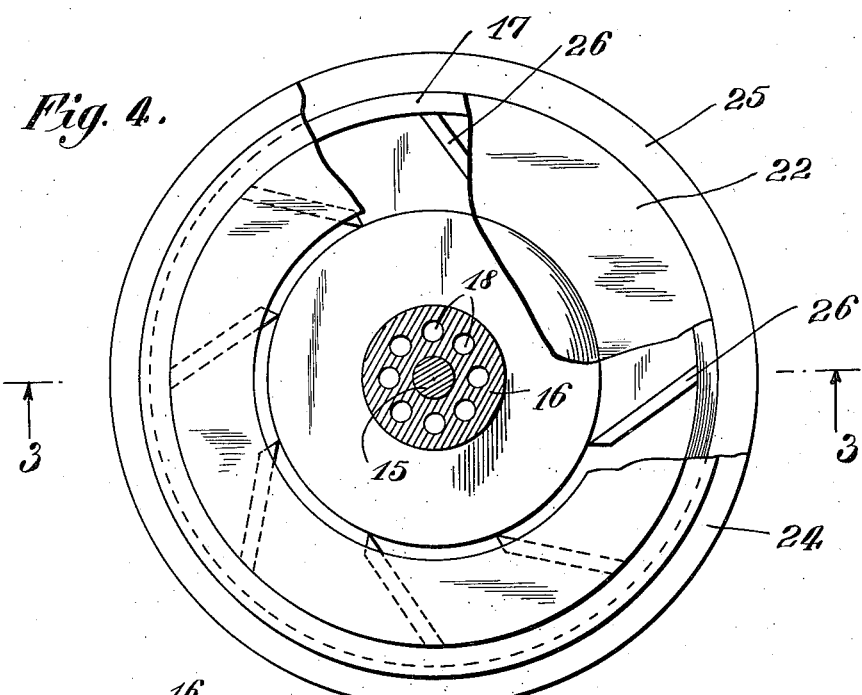
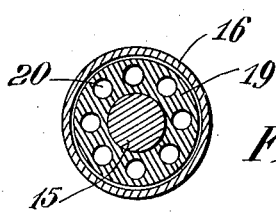
INVENTOR
Martin H. Ittner
BY
Pennie Davis & Marvin
ATTORNEYS

UNITED STATES PATENT OFFICE.

MARTIN H. ITTNER, OF JERSEY CITY, NEW JERSEY.

APPARATUS FOR TREATING LIQUIDS WITH GASES.

1,242,445.   Specification of Letters Patent.   Patented Oct. 9, 1917.

Application filed January 6, 1916.   Serial No. 70,603.

*To all whom it may concern:*

Be it known that I, MARTIN HILL ITTNER, a citizen of the United States, residing at Jersey City, county of Hudson, and State of New Jersey, have invented certain new and useful Improvements in Apparatus for Treating Liquids with Gases; and I do hereby declare the following to be a full, clear, and exact description of the invention, such as will enable others skilled in the art to which it appertains to make and use the same.

My invention relates to apparatus for treating liquids with gases; and it comprises an apparatus adapted to contain a body of the liquid to be treated and provided with a centrifugal distributer or injector arranged below the normal level of the liquid and having outwardly arranged discharge passages for discharging the gases centrifugally outward therefrom, and having means for conveying thereto the gases to be so discharged.

The apparatus of the present invention is of more or less general application to the treatment of liquids with gases. It is of particular value for the hydrogenizing of oily material, such as fatty acids or their esters, by treatment of the same with hydrogen in the presence of a catalyst, as more fully described and claimed in my prior application Serial No. 52819 filed September 27, 1915. The apparatus, however, is adapted to the treatment of other liquids with other gases, and may be used, for example, for the aerating of liquids or fluids, which may contain solids in suspension, to the oxidizing of liquids by means of oxygen or air or other oxidizing gases, etc.

The novel apparatus of the present invention comprises a liquid receptacle adapted to contain the liquid to be treated, and provided with suitable inlet and outlet connections for the liquid and gas, and a centrifugal distributer or injector arranged therein below the normal liquid level, and provided with suitable means for supplying the gas thereto, so that the gas will be discharged centrifugally outward into the body of liquid.

In the preferred embodiemnt of the invention, the receptacle is closed and adapted to contain a body of the gas, either under atmospheric or increased or decreased pressure, above the liquid; and the centrifugal distributer or injector is provided with means for supplying thereto the gas so confined within the receptacle.

The invention further comprises a novel centrifugal distributer or injector, arranged below the normal liquid level, as above pointed out, which is so constructed that the liquid also is drawn in near its central portion and discharged centrifugally outward therefrom and therethrough, so that circulation of the liquid is thereby effected, and a more intimate intermingling and intermixture of liquid and gases secured.

I will now proceed to describe my invention more in detail, with particular reference to the embodiment thereof illustrated in the accompanying drawings, but it is intended and understood that the invention will be illustrated by, but is not limited to, the specific embodiment thus illustrated and described.

In the accompanying drawings,

Fig. 3 is an enlarged view showing the rotary distributer or injector of Figs. 1 and 2 in central section;

Fig. 4 is a plan view of the rotary distributer or injector, taken on the line 4—4 of Fig. 3, and with parts broken away to show the inside construction; and Fig. 5 is a sectional view taken on the line 5—5 of Fig. 3.

Figure 1:
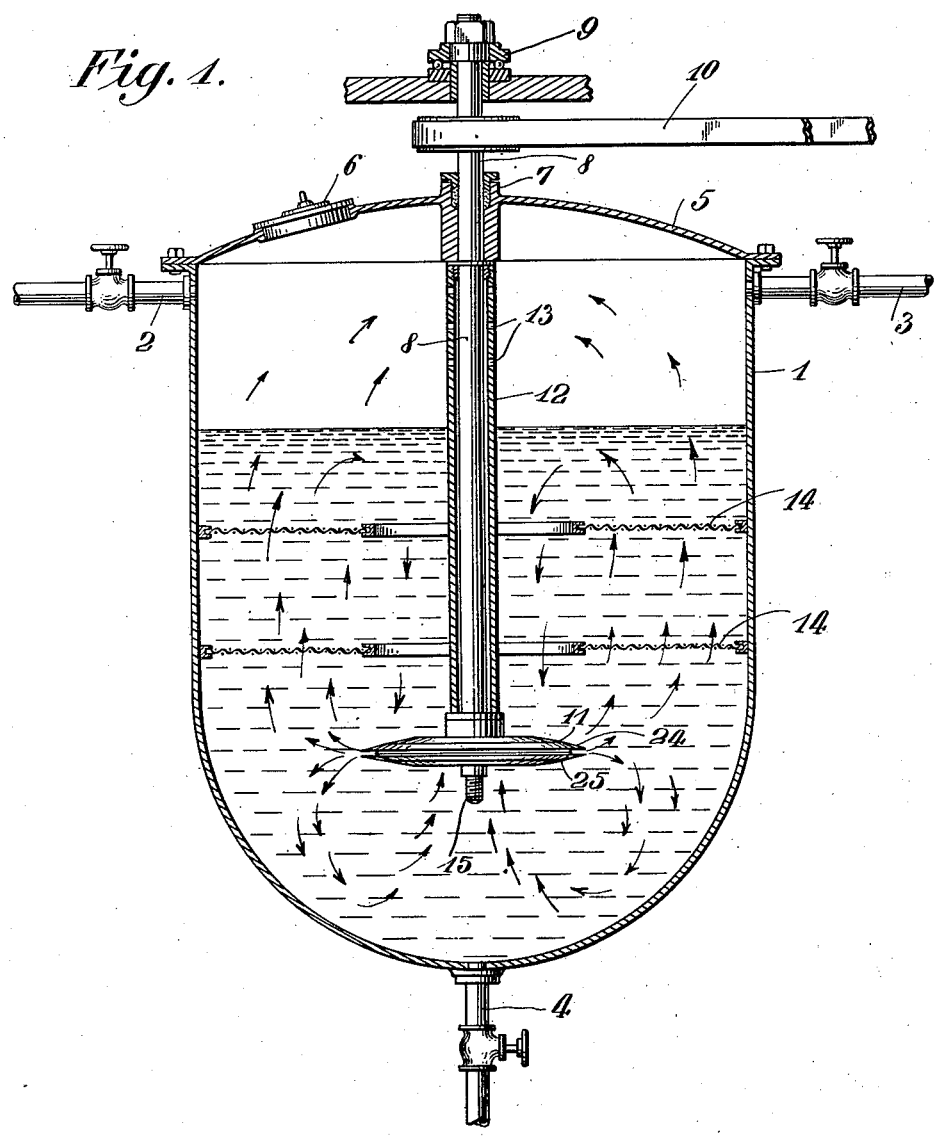
Figure 1 shows, partly in elevation and partly in vertical section, an apparatus embodying the invention.

Referring first to Fig. 1, the apparatus illustrated comprises a suitable receptacle or container 1, provided with suitable inlets 2 and 3 for the gas and for the liquid respectively, and with an outlet 4 at the bottom for drawing off the liquid. The receptacle is provided with a cover 5 suitably secured thereto and having a hand hole or other opening 6 by means of which access may be had to the interior, and solid materials or reagents may be introduced, and a bearing 7 for the driving shaft 8 of the rotary distributer or injector. This driving shaft is suitably supported in bearings 9 and may be driven in any suitable manner, as by a belt 10.

The apparatus will, in practice, usually be provided with heating and cooling means (not shown) for heating or cooling the material therein and maintaining it at the required temperature, if the liquid, or the reaction which takes place upon treating it with the gas, is one which requires temperature regulation.

The size and shape of the apparatus, as well as the means for supporting and driving the shaft 8, can be varied as desired, since obviously many different types of bearings and driving means are available.

Carried on the lower end of the shaft 8 is the rotary injector or distributer 11, from which extends upwardly the sleeve 12, surrounding the shaft 8 and spaced away therefrom. This sleeve is suitably supported at its upper end, with respect to the shaft, and is provided with three rows of inlets 13 leading from the surrounding atmosphere within the receptacle to the space between the sleeve and shaft.

By reference to Figs. 3 and 4 it will be seen that the rotary injector or distributer is made up of upper and lower elements 17 and 22, mounted upon the lower end 15 of the shaft 8 and suitably spaced apart thereon and with respect to each other by means of the ring 23. These elements are suitably fastened upon the end of the shaft which may be screw-threaded for this purpose so that the elements may be themselves threaded thereon. The threads are so arranged with respect to the direction of rotation of the distributer that the elements are firmly held thereon during rotation, and can only be loosened from the shaft by turning in the reverse direction. A lock nut (not shown) for holding the elements from loosening can also be used.

The upper member 17 has an upwardly extending portion 16 having holes 18 therein which communicate with corresponding holes 20 in the connection 19. These holes in turning communicate with the space between the shaft and sleeve, as clearly shown in the drawing. A lock-nut 21 is provided at the upper end of the member 17.

Carried by the members 17 and 22, and spaced apart therefrom by spacing members 26, are outer annular members 24 and 25, suitably secured thereto as by brazing or otherwise.

As indicated in Fig. 4 the spacing members 26 are arranged somewhat at an angle so that they exert an outward impelling effect upon the liquid during their rotation. The arrangement is such that the rotary injector or distributer acts centrifugally, much as a centrifugal pump, drawing in the liquid from above and below through the central annular openings, and discharging the same outwardly between the spacing members 26. The arrangement is also such that the gas confined within the upper portion of the receptacle will pass through the space between the shaft and sleeve and will be drawn through the narrow space between the member 17 and 22. This injector or ejector action of the liquid coöperates with the rotation of the distributer to draw the gas outwardly therewith so that a most intimate intermixture takes place.

In order to avoid too much agitation of the liquid, it is in some cases advantageous to place stationary screens or other suitable perforated baffles beneath the surface of the liquid in such a manner as to break up and prevent any strong currents of the liquid, and particularly any such currents as might result in the formation of a vortex, due to the centrifugal action of the injector. Such perforated screens or baffles are indicated at 14 in Fig. 1, these baffles being arranged in the path of the rising liquid, and the central portion being free so that the liquid can pass in an unobstructed manner at this point.

An intermixture of the liquid and gas of such intimacy is obtained with the centrifugal distributer of the present invention that agitation can add but little to the efficiency of the intermixture. Accordingly, and contrary to what might be expected, I find it more advantageous in some cases to avoid too much agitation of the liquid. Undue agitation will tend to send up strong currents which will have the effect of separating the gas from the liquid to a greater or less degree. This is particularly true of the agitation resulting from the centrifugal action of the distributer which will tend to draw the liquid to the outer part of the apparatus and the lighter gas toward the center. The screens or baffles are accordingly of value in decreasing such currents and undesirable agitation, where the treatment is of such a nature that this agitation is not desired. The provision of the wire screens or baffles of Fig. 1 results in the breaking up of the currents without simply deflecting them, so that the separation of the gas from the liquid is to a corresponding extent retarded and their action prolonged.

With the arrangement of Fig. 1, the volume of gas in a fine state of division throughout the liquid may be so great, and its rate of disengagement so slow, that the surface of the liquid will be raised very appreciably above the normal level of the liquid when the apparatus is not in operation.

Figure 2:
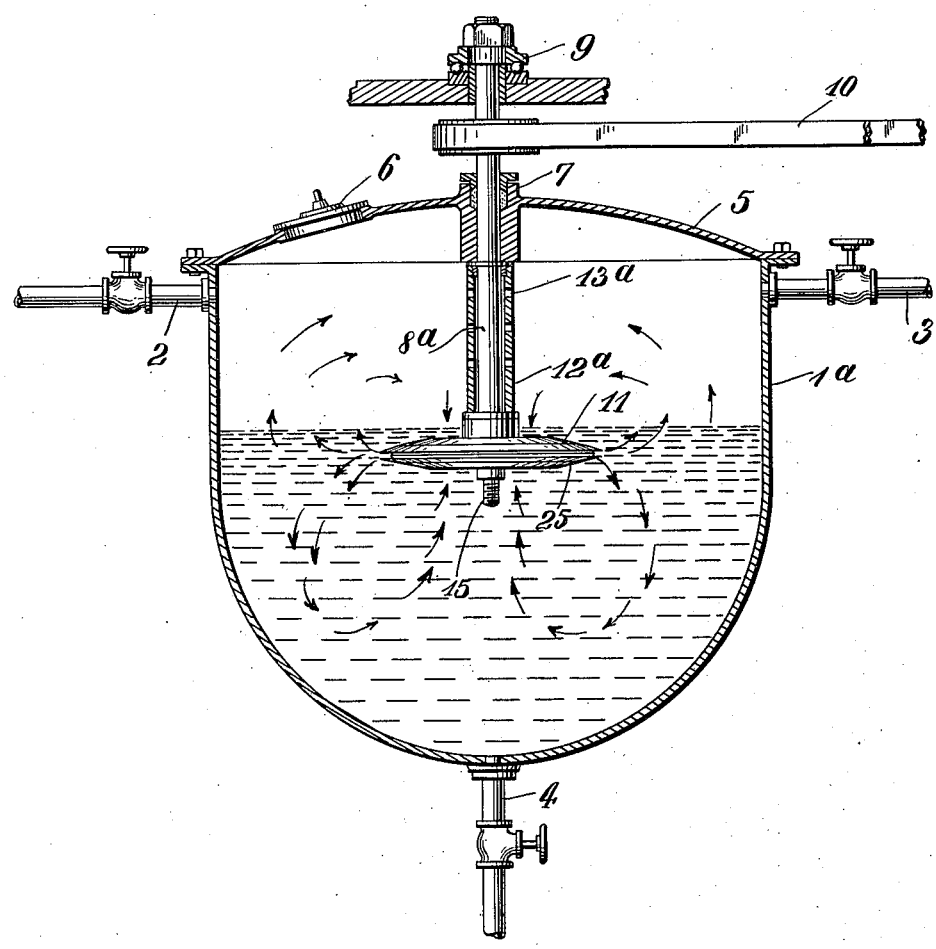
Fig. 2 shows a modified construction.

The construction of Fig. 2 is similar to that of Fig. 1 except that the receptacle or container 1$^a$ is of a shallower construction, and the shaft 8$^a$ and sleeve 12$^a$, are shorter than the corresponding elements of Fig. 1. Also the baffles, which may be dispensed with, are not provided in the construction of Fig. 2, and the rotary distributer, instead of being arranged a considerable distance below the surface of the liquid, is arranged near the surface.

With the arrangement of Fig. 1, where the distributer is a considerable distance below the surface of the liquid, the gas must pass through the space between the shaft and sleeve, and the liquid enters the outer portion of the rotary distributer from the top and bottom. With the arrangement of Fig. 2, where the rotary distributer is arranged near the surface of the liquid, the tendency of the distributer is to form a vortex so that the liquid at the center of the apparatus will be lowered during the rotation of the distributer. The same circulation of the liquid will tend to take place through the distributer as with the arrangement of Fig. 1, but the lowering of the liquid at the central portion of the distributer will in practice be such that the gas will be drawn in with the liquid and will pass outwardly therewith between the upper disk 24 and the upper element 17 of the distributer. That is to say, the depression of the liquid due to the centrifugal action of the distributer will cause such an outward flow of the liquid through the distributer that the gas will be entrained therewith and an added intermixture thus secured. The arrangement of the distributer near the surface of the liquid is accordingly advantageous for this reason, and its arrangement should in practice be such that a sufficient lowering of the liquid level to effect the entraining of the gas therewith will be secured, where this added intermixture is desired.

The currents of the liquid and of the gas are indicated roughly by the arrows in Figs. 1 and 2. It will be seen that the confined gas within the upper portion of the receptacle enters the space between the shaft and sleeve and is distributed outwardly, intimately mixed with the liquid, into the surrounding body of liquid. The liquid then tends to circulate outward, due to the centrifugal action of the distributer, and thence both upwardly and downwardly and back to the central portion of the distributer at both its top and bottom. The gas tends to rise and to separate again from the liquid except as it is so finely distributed therethrough that it is held and circulated therewith. Where the gas is one which combines with the liquid, it will be to that extent withdrawn from circulation; and in such cases provision may be made for replenishing the supply to make up for the part absorbed.

As the liquid circulates outwardly through the distributer, it is intimately intermixed with the gas, and at the same time subjected to frequent sudden and extreme variations in pressure, alternately above and below the average pressure maintained within the liquid receptacle, whereby the intimacy of the intermixture is materially promoted, and rapid and effective progress of the reaction between the liquid and gas secured. The liquid will be continuously circulated and returned to the injector and repeatedly passed therethrough, so that all parts of the liquid will be intimately subjected to the treatment with the gas or gases, and the gas or gases will be thereby intimately mixed with and distributed through the liquid. These sudden and extreme variations in pressure are due to the fact that the liquid and gas are sucked into the injector near its central portion and discharged outwardly therethrough into the surrounding body of liquid, a diminished pressure being caused by the suction of the injector and the increased pressure by the discharge outwardly into the main body of the liquid.

The apparatus of the present invention is adapted for the treatment of successive charges of liquid with the gas by introducing the liquid into the apparatus and there treating it with the gas. It is also adapted to the treatment of liquids with gases in a continuous manner by continuously feeding the liquid to the apparatus, and continuously drawing off the treated liquid, or by feeding the liquid through a series of apparatus, in succession. Where successive individual charges of the liquid are treated in the same apparatus, the liquid will pass and re-pass the injector in a cyclic manner, and during each passage further amounts of the gas will be entrained and the mixture will be subjected to variations in pressure in the manner already described. Fresh particles of the liquid and gas are thus brought into contact with each other, while the rotary distributer causes a sufficient circulation to insure that all parts of the liquid are subjected to the action of the gases.

In treating oils with hydrogen it is customary to mix a catalyzer with the oil in order to promote the reaction of the hydrogen with the oil. The circulation effected by the rotary injector prevents the catalyzer from settling out and keeps it in suspension in the oil so that it is re-circulated therewith and thus brought into intimate contact with the hydrogen.

The gas confined within the receptacle may be at atmospheric pressure or it may be at an increased or decreased pressure. With some gases it is advantageous to use a pressure materially higher than atmospheric, and such pressures can readily be utilized with the apparatus of the present invention. Further amounts of the gas may be supplied to make up for those which are absorbed during the treatment, and when the gas has become vitiated or too impure for further treatment it can be drawn off and fresh amounts introduced.

From the above description it will be seen that the apparatus of the present invention enables the treatment of liquids with gases to be practised in a smooth and advantageous manner. Whereas the spraying or filming of liquids through gases for the purpose of effecting the treatment of the liquids with the gases may, and often does, result in an uneven treatment of the liquid so that certain parts will be thoroughly treated while others will escape treatment, the apparatus of the present invention enables the treatment to be practised so that all parts of the liquid are treated at substantially the same rate and in a progressive manner. The treatment can accordingly be terminated at any intermediate point and a partially treated product obtained of a more nearly homogeneous nature.

The particular type of centrifugal distributer or injector illustrated and described is one which has been found in practice to have many advantages. I have, however, obtained good results with distributers embodying the same or similar features of construction, but differing in their particular arrangements. It is important, however, that there should be provided as a part of the centrifugal distributer means for effecting the discharge outwardly into the body of liquid of the treating gas. In the preferred embodiments of the invention means is also provided for effecting the circulation of the liquid outwardly through the distributer and back to the central portion thereof, in a continuous or cyclic manner.

The arrangement of the distributer illustrated is such that the discharge of both the liquid and the gas from the distributer takes place together. That is to say, gas is discharged outwardly and is intimately mixed with the liquid which is also being discharged outwardly through the distributer. While the provision of means for discharging the gas centrifugally outward in itself forms an important aspect of the invention, irrespective of whether the liquid is circulated through the distributer and discharged outwardly therethrough, either at the same or a different place from where the gas is discharged, yet the combination in a single distributer of means for discharging both the liquid and the gases together forms an important construction and one having in practice material advantages.

I claim:

1. An apparatus for treating liquids with gases, comprising a liquid receptacle, a centrifugal distributer for the gases arranged below the normal liquid level in said receptacle and having outwardly arranged discharge passages for discharging the gases outward therefrom by centrifugal action into the body of liquid, and means for conveying the gases to said distributer; substantially as described.

2. An apparatus for treating liquids with gases, comprising a liquid receptacle, a centrifugal distributer arranged below the normal level of the liquid in the receptacle, said distributer being provided with means for intermixture of the gases and liquid under conditions of pressure alternately diminished and increased abruptly and rapidly with respect to the average pressure maintained within the liquid receptacle; substantially as described.

3. An apparatus for treating liquids with gases, comprising a liquid receptacle, a centrifugal distributer for the gases arranged below the normal liquid level in said receptacle and having outwardly arranged discharge passages for discharging the gases centrifugally outward therefrom into the body of liquid, a shaft for driving said distributer having a bearing in the top of said receptacle, said receptacle being closed at its upper portion to confine the treating gases therein, and a sleeve surrounding said shaft and spaced away therefrom and communicating with the distributer and with the space above the normal liquid level for conveying the treating gases to the distributer; substantially as described.

4. An apparatus for treating liquids with gases comprising a liquid receptacle, a centrifugal distributer for the gases arranged below the normal liquid level in said receptacle and having separate outwardly arranged discharge passages for discharging the gases and liquid centrifugally outward therefrom into the body of liquid, and being further provided with a central inlet for the liquid, and means for conveying the treating gases to said distributer, whereby circulation of the liquid is effected, and an intimate intermixture of the liquid and gases is effected, substantially as described.

5. An apparatus for treating liquids with gases comprising a liquid receptacle, a centrifugal distributer for the gases arranged below the normal liquid level in said receptacle and having outwardly arranged discharge passages for discharging the gases centrifugally outward therefrom, means for conveying the gases to said distributer, and said distributer being further provided with a liquid inlet near its central portion and with means for discharging the liquid centrifugally outward therethrough and for intimately mixing the liquid and gases during their passage outwardly through the distributer, substantially as described.

6. An apparatus for treating liquids with gases comprising a liquid receptacle, a centrifugal distributer for the gases arranged below the normal liquid level in said receptacle and having outwardly arranged discharge passages for discharging the gases centrifugally outward therefrom into the body of liquid, means for conveying the gases to said distributer, said distributer being provided with central inlets at its upper and lower portions and with outwardly arranged discharge passages for discharging the liquid centrifugally outward therefrom, and for intimately mixing the liquids and gases, substantially as described.

7. An apparatus for treating liquids with gases comprising a closed liquid receptacle for confining a body of liquid and a body of gas thereabove under suitable pressure, a centrifugal distributer for the gases arranged below the normal liquid level in said receptacle and having outwardly arranged discharge passages for discharging the gases centrifugally outward therefrom into the body of liquid, and means for conveying the gases from the upper portion of said receptacle to said distributer, whereby the gases are continuously circulated from the upper portion of the receptacle to the distributer and thence outwardly into the liquid whence the unabsorbed gases rise to be again circulated, substantially as described.

8. A centrifugal distributer for treating liquids with gases provided with a gas inlet and with outwardly arranged discharge passages for discharging the gases centrifugally therefrom, said distributer being further provided with one or more liquid inlets near its central portion and having outwardly arranged discharge passages therefrom for discharging the liquid centrifugally outward and for intimately mixing the liquids and gases, substantially as described.

9. A centrifugal distributer for treating liquids with gases comprising a driving shaft, upper and lower disks having therebetween outwardly arranged discharge passages for discharging the gases centrifugally therefrom, annular rings above and below said disks and spaced apart therefrom and from said shaft to provide inlet openings between the rings and shaft and outwardly arranged discharge passages between the rings and disks, and outwardly arranged elements between said disks and rings for impelling the liquid centrifugally outward therebetween.

10. A centrifugal distributer for treating liquids with gases comprising a driving shaft, upper and lower disks mounted thereon and spaced apart from each other to provide outwardly arranged discharge passages for discharging the gases centrifugally outward therefrom, means for conveying the gases to the space between said disks near the center thereof, annular rings arranged above and below said disks and spaced apart therefrom and from the shaft to provide inlet openings for the liquid between the rings and shaft and outwardly arranged discharge passages for the liquid between the rings and disks, spacing elements between said disks and rings arranged to exert an outwardly impelling effect upon the liquid and to promote the outward discharge therebetween, and said rings extending outwardly beyond the disks and being arranged to permit an intimate mixing of the liquids and gases therebetween before discharge into the surrounding body of liquid, substantially as described.

11. An apparatus for treating liquids with gases and comprising a liquid receptacle, a centrifugal distributer for the gases arranged below the normal liquid level in said receptacle and having outwardly arranged discharge passages for discharging the gases outward therefrom by centrifugal action into the body of liquid, means for conveying the gases to said receptacle, and means for conveying the gases from the upper portion of said receptacle above the normal liquid level to the centrifugal distributer below the liquid level, substantially as described.

In testimony whereof I affix my signature.

MARTIN H. ITTNER.